US008720969B2

(12) United States Patent
Young

(10) Patent No.: US 8,720,969 B2
(45) Date of Patent: May 13, 2014

(54) CARGO AREA PROTECTOR WITH HINGED OUTBOARD FLAPS

(75) Inventor: John Young, Royal Oak, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/613,895

(22) Filed: Sep. 13, 2012

(65) Prior Publication Data
US 2014/0070560 A1 Mar. 13, 2014

(51) Int. Cl.
*B60R 5/04* (2006.01)

(52) U.S. Cl.
CPC .. *B60R 5/044* (2013.01); *B60R 5/04* (2013.01)
USPC .................................. 296/97.23; 296/100.01

(58) Field of Classification Search
USPC ................ 296/37.3, 37.8, 37.14, 37.16, 39.1, 296/97.23, 100.01, 100.06, 136.01; 224/328, 539
See application file for complete search history.

(56) References Cited

U.S. PATENT DOCUMENTS

| | | | |
|---|---|---|---|
| 5,080,417 A | 1/1992 | Kanai | |
| 5,441,183 A | 8/1995 | Frenzel | |
| 6,003,921 A * | 12/1999 | Tozuka | 296/37.2 |
| 6,290,278 B1 * | 9/2001 | Loveland | 296/39.1 |
| 6,508,499 B1 | 1/2003 | Guanzon et al. | |
| 6,719,348 B1 | 4/2004 | Song | |
| 2002/0053810 A1 * | 5/2002 | Kaluszka et al. | 296/37.3 |
| 2002/0070574 A1 | 6/2002 | Carlsson et al. | |
| 2003/0057724 A1 * | 3/2003 | Inagaki et al. | 296/37.8 |
| 2008/0100082 A1 * | 5/2008 | Heo | 296/37.16 |
| 2010/0072768 A1 | 3/2010 | Stossel | |
| 2011/0062742 A1 * | 3/2011 | Alford | 296/97.23 |

FOREIGN PATENT DOCUMENTS

| | | |
|---|---|---|
| DE | 19802077 A1 | 8/1998 |
| FR | 2945007 A1 | 11/2010 |
| WO | 2004065197 A1 | 8/2004 |

* cited by examiner

*Primary Examiner* — Glenn Dayoan
*Assistant Examiner* — Jason S Daniels
(74) *Attorney, Agent, or Firm* — Young, Basile, Hanlon & MacFarlane, P.C.

(57) ABSTRACT

A vehicle cargo compartment assembly is provided that has a vehicle floor defining an opening for a storage compartment and a lid sized for covering the opening and moveable between a closed position and an open position. A cargo mat has a body portion overlaying the lid and is moveable with the lid between the closed position and the open position. An outboard flap extends beyond the lid to overlay a portion of the vehicle floor bordering the opening when the lid is in the closed position. The outboard flap is supported by the vehicle floor when the lid is in the closed position, and the outboard flap is hinged to the body portion such that the outboard flap extends downward at a hanging angle with respect to the body portion when the lid is in the open position.

15 Claims, 6 Drawing Sheets

US 8,720,969 B2

CARGO AREA PROTECTOR WITH HINGED OUTBOARD FLAPS

TECHNICAL FIELD

The embodiments disclosed herein generally relate to a cargo mat for protecting the cargo area of a vehicle.

BACKGROUND

A vehicle may be configured to include an under-floor storage compartment in a cargo area at the rear of the vehicle. The storage compartment can be selectively covered or concealed by a cargo lid that is coupled to the floor for movement between a closed position, where the cargo lid is adjacent to the floor of the cargo area, and an open position, where the lid is moved away from the floor to expose the storage compartment. Design or other constraints may require the cargo area to have an irregular shape, such that the width of the cargo area at the floor level is greater than the width of the cargo area at a level occupied by the lid during its movement. In this instance, the lid can have a width less than the full width of the cargo area at the floor level in order to prevent interference between the lid and the cargo area.

A cargo mat can be provided for the cargo area that overlays the lid and moves with the lid during its movement. It may be desirable for the cargo mat to overlay the lid when the lid is in the closed position, as well as extend beyond the lid to overlay the floor around the lid. However, such a cargo mat may interfere with the cargo area during movement of the lid.

SUMMARY

Disclosed herein are embodiments of a cargo mat. In one aspect, a vehicle cargo compartment assembly comprises: a vehicle floor defining an opening for a storage compartment; a lid sized for covering the opening and moveable between a closed position, where the lid is positioned to cover the opening, and an open position, where the lid is removed from the opening to expose the opening; and a cargo mat having a body portion overlaying the lid and moveable with the lid between the closed position and the open position and an outboard flap extending beyond the lid to overlay a portion of the vehicle floor bordering the opening when the lid is in the closed position, wherein: the outboard flap is supported by the vehicle floor when the lid is in the closed position, and the outboard flap is hinged to the body portion such that the outboard flap extends downward at a hanging angle with respect to the body portion when the lid is in the open position.

In another aspect, a cargo mat for a vehicle cargo area comprises: a body portion sized for overlaying an under-floor storage compartment lid; and at least one outboard flap extending from the body portion, wherein: the outboard flap is hinged to the body portion for pivotal movement, such that the outboard flap extends downward at a hanging angle with respect to the body portion when the body portion is supported by the lid and the outboard flap hangs from the body portion unsupported by the lid.

In another aspect, a vehicle cargo compartment assembly comprises: a vehicle floor extending a width in a transverse direction between first and second upright vehicle walls and defining an opening for a storage compartment; a lid sized for covering the opening, the lid extending in the transverse direction less than the width of the vehicle floor and moveable between a closed position, where the lid is positioned to cover the opening, and an open position, where the lid is removed from the opening to expose the opening and where a transverse portion of the lid is adjacent to the first upright vehicle wall; and a cargo mat extending the width of the vehicle floor, the cargo mat having a body portion overlaying the lid and moveable with the lid between the closed position and the open position, and an outboard flap extending beyond the transverse portion of the lid to overlay an outer portion of the vehicle floor bordering the opening and extending to the first upright vehicle wall when the lid is in the closed position, wherein: the outboard flap is supported by the outer portion of the vehicle floor when the lid is in the closed position, and the outboard flap is hinged to the body portion, such that the outboard flap extends downward at a hanging angle from the transverse portion of the lid when the lid is in the open position to clear the first upright vehicle wall as the lid is moved from the closed position to the open position.

These and other aspects will be described in additional detail below.

BRIEF DESCRIPTION OF THE DRAWINGS

The various features, advantages and other uses of the present apparatus will become more apparent by referring to the following detailed description and drawing in which.

DETAILED DESCRIPTION

Disclosed herein are embodiments of a cargo mat for overlaying the cargo lid of an under-floor storage compartment in a vehicle cargo area. The cargo mat can optionally extend beyond the cargo lid to overlay the vehicle floor around the cargo lid, while having features for preventing interference between the cargo mat and the cargo area during movement of the lid.

All references to "front," "forward," and the like, as well as references to "rear," "rearward," and the like herein are used with respect to a longitudinal direction of a vehicle. Specifically, "front," "forward," and the like refer to the front (fore) of the vehicle, while "rear," "rearward," and the like refer to the back (aft) of the vehicle.

Figure 1:
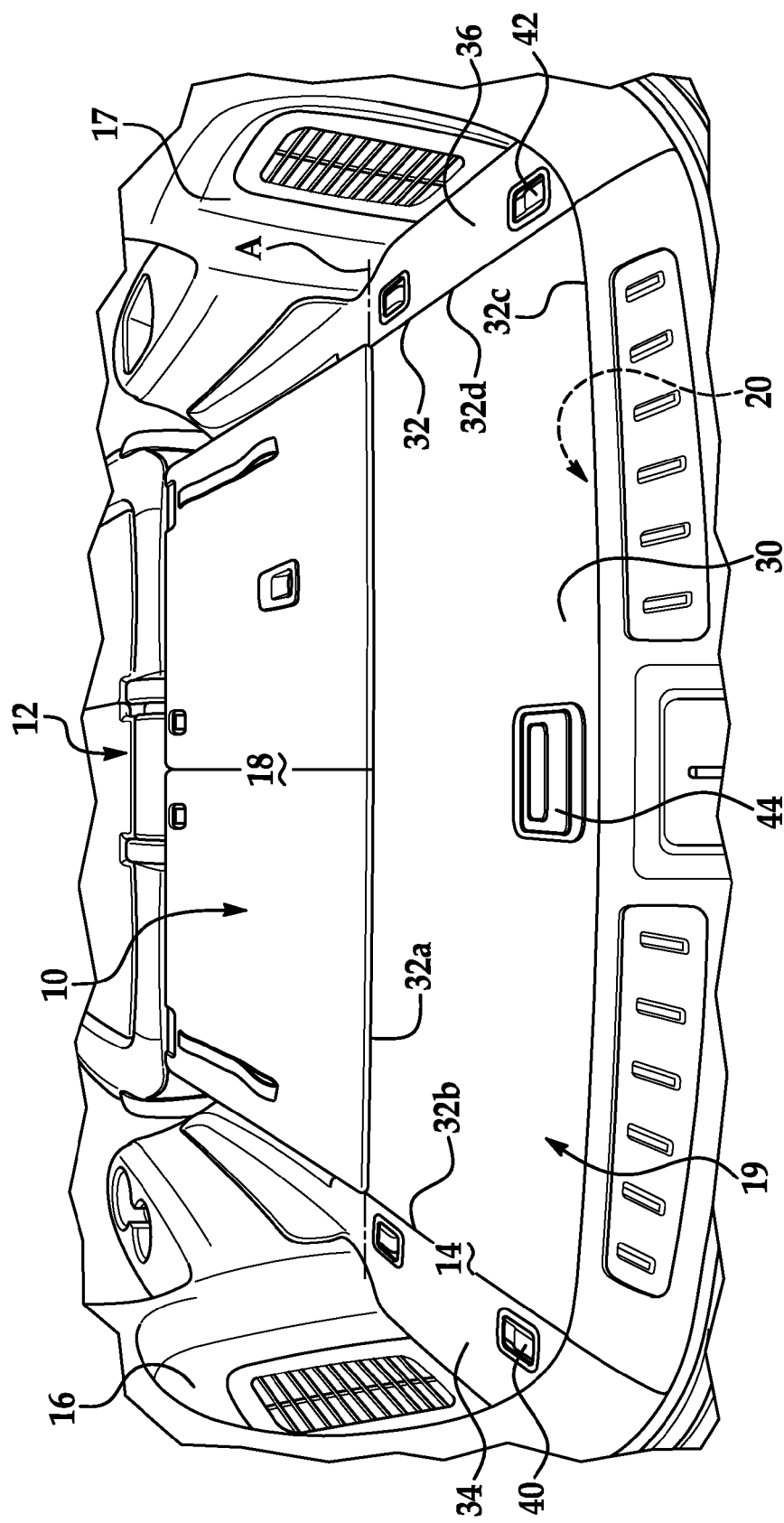
FIG. 1 is a perspective view of the cargo area of a vehicle and showing a cargo lid in a closed position.

The rear cargo area 10 of a vehicle interior 12 is shown in FIG. 1. The cargo area 10 is generally defined within the vehicle interior 12 by a vehicle floor 14, a pair of opposed upright vehicle side walls 16 and 17, rear vehicle seat(s) 18, and a door, hatch, lift gate or other means for closing a rear cargo opening 19. The vehicle floor 14 extends in the rear cargo area 10 generally horizontally in a transverse direction of the vehicle between the pair of vehicle side walls 16 and 17, and in a longitudinal direction of the vehicle from the rear vehicle seat(s) 18 to the rear cargo opening 19. The vehicle side walls 16 and 17 are opposedly disposed with respect to the vehicle floor 14. The portions of the vehicle side walls 16 and 17 facing the rear cargo area 10 can be composed of or include metal or other vehicle body material, trim panels, and vehicle components such as seatbelts, audio/visual equipment, storage compartments, HVAC equipment, cargo retention structures, or access doors, for example, or a combination thereof. Each of the vehicle side walls 16 and 17 extend generally vertically and generally perpendicular to the vehicle floor 14 in a longitudinal direction of the vehicle.

The illustrated vehicle floor 14 defines an opening 20 for an under-floor storage compartment 88 (shown in FIGS. 3 and 4) beneath the vehicle floor 14. The cargo area 10 also includes a cargo lid 30 that is generally sized to cover or conceal the opening 20 defined by the vehicle floor 14. The cargo lid 30 is illustrated in FIG. 1 in a closed position, where the cargo lid 30 is positioned to cover the opening 20. The cargo lid 30 can be configured with respect to the vehicle floor 14 and opening 20 to sit substantially flush with the portions of the vehicle floor 14 that border the opening 20, such that a continuous vehicle floor 14 is formed.

The cargo lid 30 has a perimeter edge 32 that defines a profile approximating that of the opening 20 defined by the vehicle floor 14. The illustrated cargo lid 30 has a generally rectangular shape, although other shapes could be implemented depending, for example, on the shape of the opening 20. As shown, the perimeter edge 32 of the cargo lid 30 has a forward portion 32a, a first transverse portion 32b, a rearward portion 32c and a second transverse portion 32d.

With the cargo lid 30 in the closed position, the perimeter edge 32 is disposed adjacent corresponding portions of the vehicle floor 14 that border the opening 20. As shown in FIG. 1, the first transverse portion 32b of the perimeter edge 32 is adjacent an outer portion 34 of the vehicle floor 14 that extends between the opening 20 and the vehicle side wall 16. Similarly, the second transverse portion 32d of the perimeter edge 32 is adjacent an outer portion 36 of the vehicle floor 14 that extends between the opening 20 and the vehicle side wall 17. The opening 20 and the cargo lid 30 could alternatively and/or additionally be bordered by other portions of the vehicle floor 14, for example, portions of the vehicle floor 14 forward or rear of the opening 20 proximate the rear vehicle seat(s) 18 and/or the rear cargo opening 19. The outer portions 34 and 36 of the vehicle floor 14 can include one or more cargo retention structures, such as the illustrated tie-down anchors 40 and 42, for example, or any other cargo retention structures or vehicle components.

The cargo lid 30 is moveable between the illustrated closed position, where the cargo lid 30 is positioned to cover the opening 20, to an open position, where the cargo lid 30 is removed from the opening 20 to expose the storage compartment 88. The cargo lid 30 is generally upwardly moveable with respect to the vehicle floor 14, such that one or more portions of the perimeter edge 32 are disposed upward of the vehicle floor 14 when the cargo lid 30 is in the open position.

The cargo lid 30 is shown as a non-limiting example hingedly coupled to the vehicle floor 14 for rotation about an axis A. The axis A extends in the transverse direction of the vehicle generally along the forward portion 32a of the perimeter edge 32 of the cargo lid 30. As the cargo lid 30 rotates upward about the axis A to the open position, the first transverse portion 32b, the rearward portion 32c and the second transverse portion 32d are disposed upward of the vehicle floor 14, with the first and second transverse portions 32b and 32d extending at an angle from the vehicle floor 14, as explained below. The illustrated cargo lid 30 includes a handle 44 accessible from a top surface of the cargo lid 30 and operable to unlatch the cargo lid 30 with respect to the vehicle floor 14 in order to permit rotation of the cargo lid 30 about the axis A.

Figure 2:
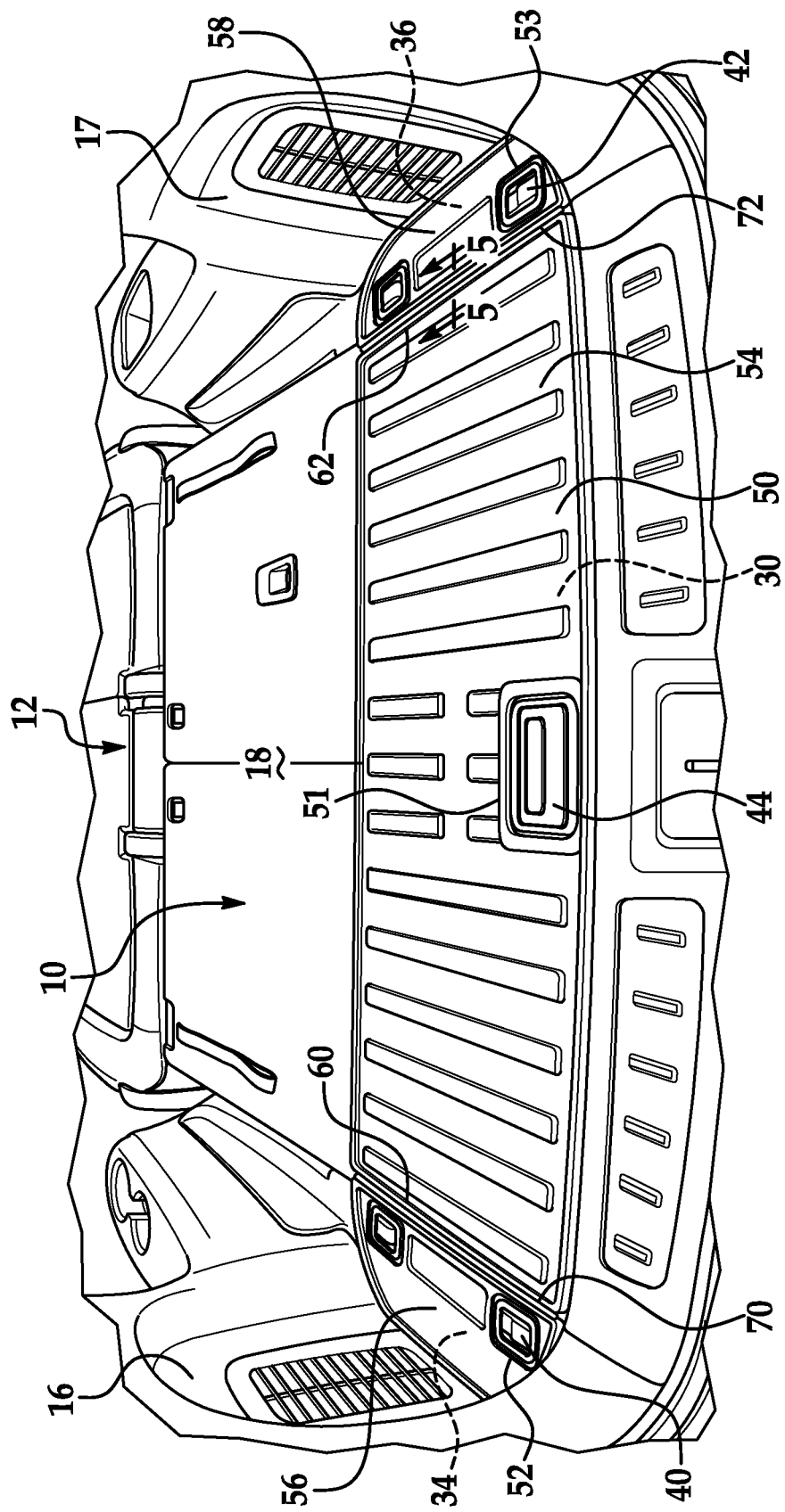
FIG. 2 is a perspective view of the cargo area of FIG. 1 showing a cargo mat covering the cargo lid and the floor of the cargo area.

With additional reference to FIG. 2, a cargo mat 50 can be positioned in the cargo area 10 to protect the vehicle floor 14 and cargo lid 30 from wear, dirt, water, etc. The cargo mat 50 is generally disposed in a transverse direction of the vehicle between the pair of vehicle side walls 16 and 17, and in a longitudinal direction of the vehicle from the rear vehicle seat(s) 18 to the rear cargo opening 19.

The cargo mat 50 is positioned over the cargo lid 30, and can move with the cargo lid 30 as the cargo lid 30 is moved between the closed and open positions. The cargo mat 50 may be coupled to the cargo lid 30 to hinder translational movement of the cargo mat 50 with respect to the cargo lid 30. As one non-limiting example, the cargo mat 50 could be coupled to the cargo lid 30 with a fabric hook-and-loop fastener, although other coupling mechanisms could be implemented. The cargo mat 50 can optionally include features for accommodating any components of the vehicle floor 14 and/or cargo lid 30. For example, the illustrated cargo mat 50 includes a cutout 51 for accommodating the handle 44 for the cargo lid 30, and cutouts 52 and 53 for accommodating the tie-down anchors 40 and 42 of the outer portions 34 and 36 of the vehicle floor 14.

Design or other constraints may require the cargo area 10 to have an irregular shape, such that the width of the cargo area 10 between the pair of vehicle side walls 16 and 17 at a level of the vehicle floor 14 is greater than a width of the cargo area 10 outboard of the cargo lid 30 through its range of movement. In this instance, the cargo lid 30 can have a width less than the width of the cargo area 10 at a level of the vehicle floor 14, as generally shown, to prevent interference between the cargo lid 30 and the cargo area 10.

However, it may be desirable for the cargo mat 50 to be sized for covering substantially the entire vehicle floor 14 of the cargo area 10 that is created when the cargo lid 30 is in the closed position. As shown in FIG. 2, the illustrated example of the cargo mat 50 is sized for covering the cargo lid 30, as well as the outer portions 34 and 36 of the vehicle floor 14 that border the opening 20. The cargo mat 50 can be composed of a durable polymeric material, such as a thermoplastic polyolefin, or any other suitable material. Although the cargo mat 50 can be generally flexible, it may have enough rigidity such that portions of the cargo mat 50 that overhang the cargo lid 30 when the cargo lid 30 is in the open position extend generally outward from the cargo lid 30 when otherwise unsupported. Because of the irregular configuration of the cargo area 10, it is possible for interference to arise between such overhanging portions of the cargo mat 50 and the cargo area 10. However, as described below, the cargo mat 50 disclosed herein includes novel features for inhibiting interference between the cargo mat 50 and the cargo area 10 during movement of the cargo lid 30 between the closed position and the open position.

The cargo mat 50 includes a body portion 54 sized to overlay the cargo lid 30. The body portion 54 can overlay substantially the entire cargo lid 30, for example, with a profile approximating that of the cargo lid 30. The body portion 54, as shown, generally extends in a lateral direction between the first transverse portion 32b and the second transverse portion 32d of the perimeter edge 32 of the cargo lid 30, and in a longitudinal direction between the forward portion 32a and the rearward portion 32c. However, the body portion 54 could alternatively be sized to overlay a lesser portion of the cargo lid 30 or a greater area than the cargo lid 30.

As shown, the cargo mat 50 further includes one or more outboard portions that extend beyond the cargo lid 30. For example, with the cargo lid 30 in the illustrated closed position, an outboard flap 56 extends beyond a lateral end 60 of the body portion 54 to overlay the outer portion 34 of the vehicle floor 14 that extends between the opening 20 and the vehicle side wall 16. Similarly, an outboard flap 58 extends beyond a lateral end 62 of body portion 54 to overlay the outer portion 36 of the vehicle floor 14 that extends between the opening 20 and the vehicle side wall 17. The outboard flaps 56 and 58 can be sized to overlay substantially all or a lesser portion of the respective outer portions 34 and 36 of the vehicle floor 14.

Any undesired interference between the outboard flaps 56 and 58, and portions of the vehicle side walls 16 and 17 projecting into their path of movement as the cargo lid 30 is moved between the closed and open position, can be reduced or eliminated by connecting the outboard flaps 56 and 58 to the respective lateral ends 60 and 62 of the body portion 54 with hinges 70 and 72. A "hinge" as discussed herein with respect to the cargo mat 50 could be any feature that permits for relatively greater flexing between constituent portions of the cargo mat 50 during movement of the cargo lid 30 than would occur without the hinge. Such flexing could arise through operation of gravitational forces, could arise through contact between the outboard flaps 56 and 58 and the vehicle side walls 16 and 17, or through a combination thereof, for example. The amount of desired flexing via a hinge could depend on the amount of clearance required to inhibit interference between the outboard flaps 56 and 58 and the vehicle side walls 16 and 17. The hinges 70 and 72 could be configured to eliminate interference, for example, or sufficiently lessen the amount of interference according to some design criteria.

Figure 5:
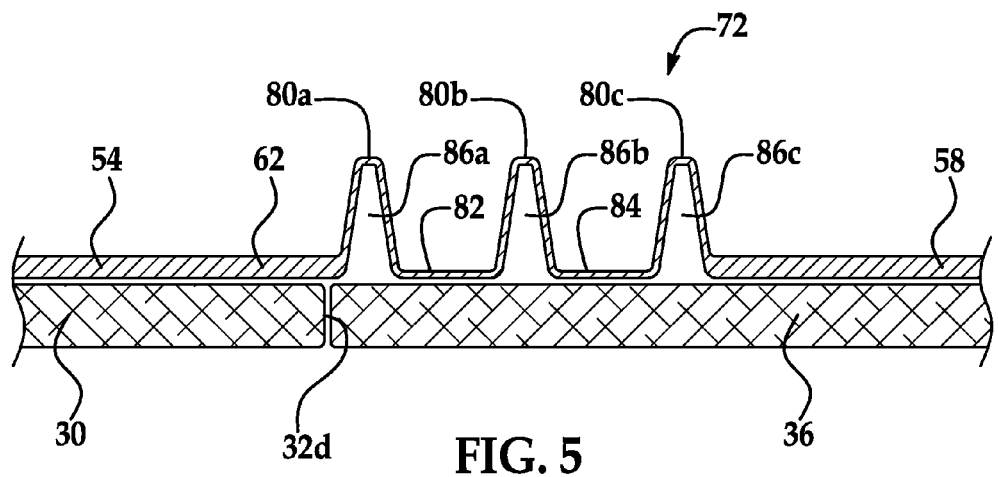
FIG. 5 is a cross section of the cargo mat taken along the line 5-5 in FIG. 2 and showing details of a hinge for the cargo mat.

A non-limiting example of the hinge 72 is described with additional reference to FIG. 5. Although the description that follows refers to the exemplary hinge 72, it will be understood that the hinge 70 is a substantial minor image of the hinge 72 and operates similarly in principle. The hinge 72 is shown here as the cargo lid 30 is in the closed position, such that the outboard flap 58 is supported by the outer portion 36 of the vehicle floor 14 to extend generally parallel from the body portion 54. The illustrated hinge 72 is integrally formed between the lateral end 62 of the body portion 54 and the outboard flap 58. The hinge 72 could be a living hinge that is integrally formed through a molding or injection process, for example, although hinge 72 could be otherwise formed. The hinge 72 could alternatively be constructed non-integrally between the body portion 54 and the outboard flap 58. That is, the hinge 72 could be a separate component from the body portion 54 and/or the outboard flap 58.

The hinge 72 is generally constructed by forming one or more hollow ribs 80a, 80b and 80c within a thinned out portion of material extending between the body portion 54 and the outboard flap 58. The adjacent hollow ribs 80a and 80b are connected through an intermediate connecting segment 82, while the adjacent hollow ribs 80b and 80c are connected through an intermediate connecting segment 84.

The hinge 72 is disposed outward of the second transverse portion 32d of the perimeter edge 32 of the cargo lid 30, and extends in a longitudinal direction perpendicular to the axis A. The hinge 72 is shown in FIG. 5 in an unloaded state, that is, where the body portion 54 is supported by the cargo lid 30, and the outboard flap 58 is supported by the outer portion 36 of the vehicle floor 14. With the hinge 72 in the unloaded state, open spaces 86a, 86b and 86c, respectively, are formed between the rise and fall portions of the hollow ribs 80a, 80b and 80c, such that the intermediate connecting segments 82 and 84 are spaced apart. In addition, the intermediate connecting segments 82 and 84 are disposed generally in the plane of the cargo mat 50.

Figure 3:
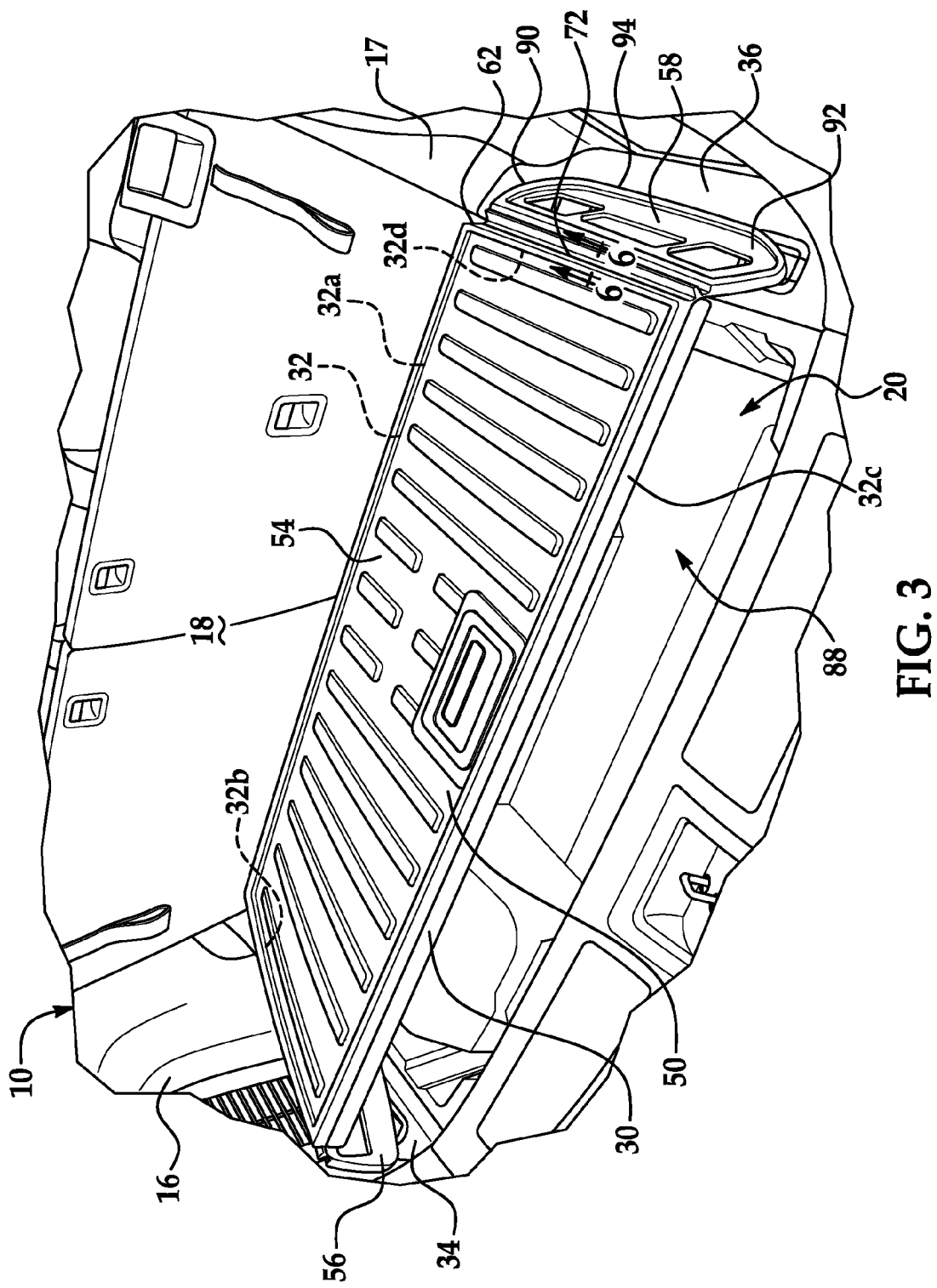
FIG. 3 is a perspective view of the cargo area and cargo mat of FIG. 2 with the lid in an intermediate position between the closed position and an open position.
Figure 6:
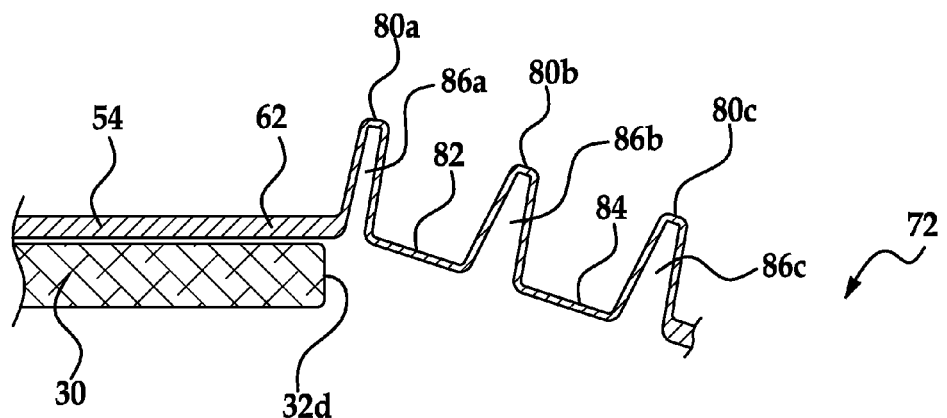
FIG. 6 is a cross section of the cargo mat taken along the line 6-6 in FIG. 3 and showing details of the hinge when the lid is in the intermediate position.
Figure 6:
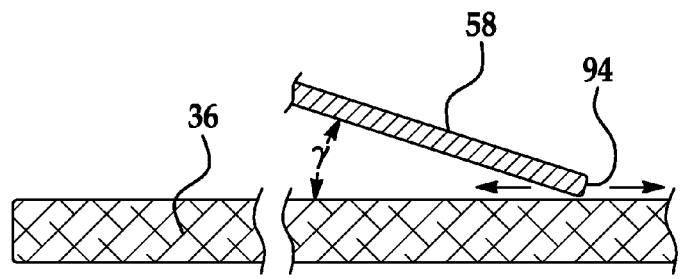

The hinge 72 is shown in FIGS. 3 and 6 as the cargo lid 30 is in an intermediate position between the closed position and the open position, such that the outboard flap 58 hangs downward from the second transverse portion 32d of the perimeter edge 32 of the cargo lid 30, but remains in supported contact with the outer portion 36 of the vehicle floor 14. The illustrated intermediate position of cargo lid 30 can be understood as an intermediate position as the cargo lid 30 is moving either toward or away from the closed position.

The hinge 72 is shown in FIG. 6 in a semi-loaded state, where the body portion 54 is supported by the cargo lid 30, and the outboard flap 58 is partially supported by the outer portion 36 of the vehicle floor 14. For the hingedly coupled cargo lid 30, the forward portion 32a of the perimeter edge 32 of the cargo lid 30 remains at a level adjacent the vehicle floor 14, while the first transverse portion 32b, the rearward portion 32c and the second transverse portion 32d are disposed upward of the vehicle floor 14, with the first and second transverse portions 32b and 32d extending at an angle from the vehicle floor 14. Specifically, the second transverse portion 32d shown is further proximate the outer portion 36 of the vehicle floor 14 nearer the forward portion 32a of the perimeter edge 32 than the rearward portion 32c. Thus, with the outboard flap 58 hanging downward from the second transverse portion 32d of the perimeter edge 32, a forward portion 90 of the outboard flap 58 remains supported by the outer portion 36 of the vehicle floor 14 near the forward portion 32a of the perimeter edge 32, while a rearward portion 92 of outboard flap 58 is unsupported by the outer portion 36 of the vehicle floor 14 near the rearward portion 32c of the perimeter edge 32.

With the hinge 72 in the semi-loaded state, the open spaces 86a, 86b and 86c are contracted relative to when the cargo lid 30 is in the closed position, and the intermediate connecting segments 82 and 84 are brought closer together. In addition, the intermediate connecting segments 82 and 84 are disposed generally in an arcuate arrangement according to the overall flexing of the hinge 72.

Figure 4:
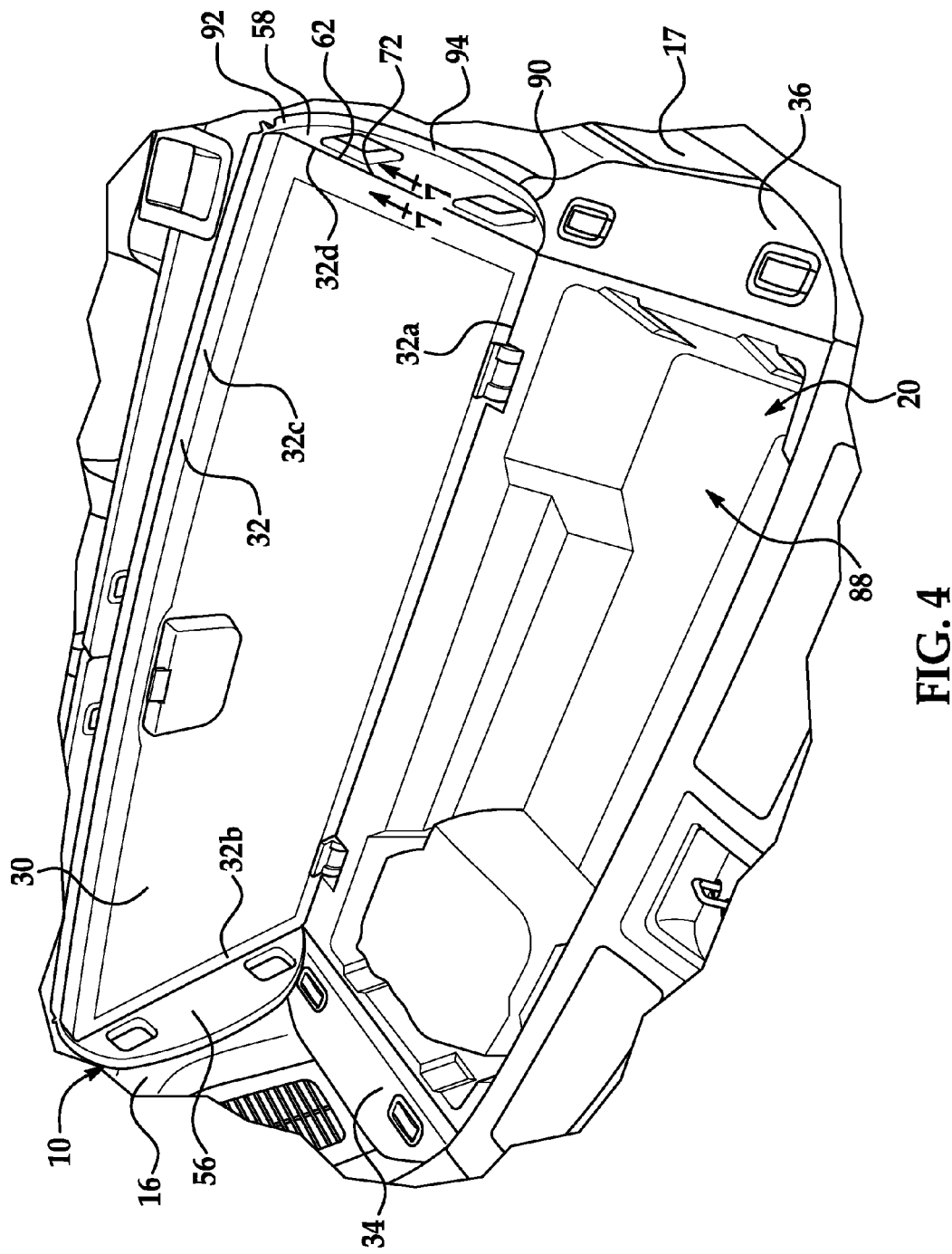
FIG. 4 is a perspective view of the cargo area and cargo mat of FIG. 2 with the lid in the open position.

The cargo lid 30 and the cargo mat 50 could be sized and configured with respect to the vehicle floor 14 such that the hinge 72 remains in at least a semi-loaded state when the cargo lid 30 is in the open position, where the forward portion 90 of the outboard flap 58 is partially supported by the outer portion 36 of the vehicle floor 14. In general, whether the forward portion 90 of the outboard flap 58 is partially supported by the outer portion 36 when the cargo lid 30 could depend on the contouring of a distal end 94 of the outboard flap 58, for example. Alternatively, as shown in FIGS. 4 and 7, the outboard flap 58 can freely hang downward from the second transverse portion 32d of the perimeter edge 32 of the cargo lid 30 when the cargo lid 30 is in the open position.

Figure 7:
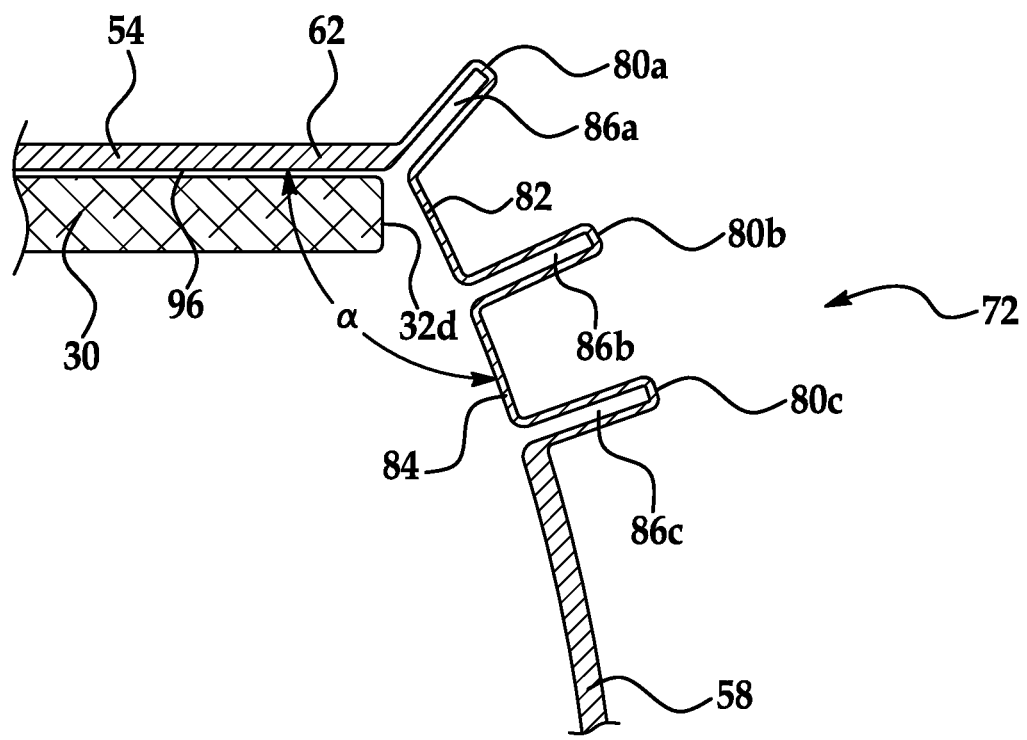
FIG. 7 is a cross section of the cargo mat taken along the line 7-7 in FIG. 4 and showing details of the hinge when the lid is in the open position.

The hinge 72 is shown in FIG. 7 when the outboard flap 58 is unsupported by the outer portion 36 of the vehicle floor 14. The hinge 72 is generally configured such that the outboard flap 58 extends downward along the second transverse portion 32d of the perimeter edge 32 of the cargo lid 30 at an obtuse angle α from the a lower surface 96 of the body portion 54 resting on the cargo lid 30.

With the hinge 72 extending freely downward, the open spaces 86a, 86b and 86c are substantially closed, and the intermediate connecting segments 82 and 84 are brought into or close to contact. When the intermediate connecting segments 82 and 84 are brought into contact, the hinge 72 generally biases the outboard flap 58 against further movement toward an underside of the cargo lid 30. In this manner, the hinge 72 can maintain the outboard flap 58 at the obtuse angle α from the body portion 54 under free-hanging conditions. However, it will be understood that other hinge constructions could be used to maintain the outboard flap 58 at the obtuse angle α from the body portion 54. In addition, the hinge 72 could be configured to maintain an obtuse angle α greater or smaller than the angle specifically illustrated.

With the outboard flap 58 at the obtuse α from the body portion 54, the outboard flap 58 is proscribed, under normal conditions, from moving underneath the cargo lid 30 as the cargo lid 30 is moved from the open position to the closed position. In addition, as can be seen with additional reference back to FIG. 6, the distal end 94 of the outboard flap 58 will contact the outer portion 36 of the vehicle floor 14 at an acute angle γ as the cargo lid 30 is moved back from the open position to the closed position. The distal end 94 of the outboard flap 58 can slidably engage the outer portion 36 of the vehicle floor 14 as movement of the cargo lid 30 continues to the closed position, traveling outward until the outboard flap 58 is supported by the outer portion 36 of the vehicle floor 14 to extend generally parallel to the outer portion 36 of the vehicle floor 14, as shown in FIGS. 2 and 5.

It can be seen that during such travel of the distal end 94 of the outboard flap 58, the obtuse angle α will enlarge towards 180 degrees, while the acute angle γ will decrease towards 0 degrees. Further, during certain portions of movement of the cargo lid 30 between the open position and the closed position, the forward portion 90 of the outboard flap 58 may remain supported by the outer portion 36 of the vehicle floor 14, while the rearward portion 92 of outboard flap 58 may be unsupported by the outer portion 36 of the vehicle floor 14. Thus, it is possible that an angle α between the forward portion 90 of outboard flap 58 and the body portion 54 will be larger than an angle α between the rearward portion 92 of outboard flap 58 and the body portion 54 during these portions of movement of the cargo lid 30.

Herein, the cargo lid 30 is described with illustrative reference to a rear cargo area 10 of a vehicle interior 12. However, the cargo lid 30 could be located otherwise within the vehicle. Likewise, the interference described with reference to the opposed upright vehicle side walls 16 and 17 could arise with respect to other vehicle obstacles. It will therefore be understood that a cargo mat 50 according to this disclosure could be configured to generally overlay and extend beyond a different cargo lid than that specifically shown, and could include one or more hinges such that a portion of the cargo mat 50 extending beyond the cargo lid can clear other obstacles within the vehicles, such as a vehicle seat, for example.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:
1. A vehicle cargo compartment assembly, comprising:
   a vehicle floor defining an opening for a storage compartment;
   a lid sized for covering the opening and moveable between a closed position, where the lid is positioned to cover the opening, and an open position, where the lid is removed from the opening to expose the opening; and
   a cargo mat having a body portion overlaying the lid and moveable with the lid between the closed position and the open position and an outboard flap extending beyond an edge of the lid to directly overlay a portion of the vehicle floor bordering the opening when the lid is in the closed position, wherein:
   the outboard flap is connected to the body portion with a hinge which also extends beyond the edge of the lid, the hinge configured to allow the outboard flap to extend downward at a hanging angle between a lid contacting portion of the body portion and the outboard flap of greater than 90 degrees and less than 180 degrees when the lid is in the open position, the hanging angle configured to inhibit interference between the cargo mat and the vehicle floor when the lid is moved from the open position to the closed position.

2. The vehicle cargo compartment assembly of claim 1, wherein:
   a distal portion of the outboard flap contacts the vehicle floor at a contact angle less than 90 degrees when the lid is moved from the open position towards the closed position, and
   the distal portion slidably engages the floor such that the contact angle decreases as the lid is moved toward the closed position.

3. The vehicle cargo compartment assembly of claim 1, wherein:
   the hinge is flexible and configured to allow, during closing of the lid, the hanging angle between the body portion and a portion of the outboard flap contacting the vehicle floor to be larger than the hanging angle between the body portion and another portion of the outboard flap that is free from contact with the vehicle floor.

4. The vehicle cargo compartment assembly of claim 1, further comprising:
   an upright vehicle wall projecting into a space adjacent the lid when the lid is in the open position, wherein:
   the outboard flap extends downward from the body portion at the hanging angle to clear the upright vehicle wall as the lid is moved from the closed position to the open position.

5. The vehicle cargo compartment assembly of claim 1, further comprising:
   the lid hingedly coupled to the vehicle floor for rotation about an axis adjacent the vehicle floor, wherein:
   at least a portion of the outboard flap proximate the axis maintains contact with the vehicle floor as the lid moves from the closed position to the open position.

6. The vehicle cargo compartment assembly of claim 5, wherein the hinge of the outboard flap extends perpendicular to the axis.

7. The vehicle cargo compartment assembly of claim 1, further comprising:
   a perimeter edge of the lid having opposed transverse portions disposed upward of the vehicle floor when the lid is in the open position, with the body portion of the cargo mat being sized to span the opposed transverse portions and having opposing lateral ends each positionable adjacent a respective opposed transverse portion, wherein:
   the cargo mat has first and second outboard flaps extending from the opposing lateral ends of the body portion, with the first and second outboard flaps connected to opposing lateral ends of the body portion with respective hinges such that the outboard flaps each extend downward from the body portion adjacent to the corresponding opposed transverse portions of the lid at the hanging angle of greater than 90 degrees and less than 180 degrees with respect to the body portion when the lid is in the open position.

8. A cargo mat for a vehicle cargo area, comprising:
a body portion sized for overlaying an under-floor storage compartment lid; and
at least one outboard flap extending from the body portion and connected to the body portion with a hinge, wherein:
the hinge is configured to maintain the outboard flap at a hanging angle between a lid contacting surface of the body portion and the outboard flap of greater than 90 degrees when the body portion is supported by the lid and the outboard flap hangs from the body portion unsupported by the lid.

9. The cargo mat for a vehicle cargo area of claim 8, wherein the body portion has a profile approximating a profile of the lid, such that the outboard flap extends beyond the lid when the body portion is positioned to overlay the lid.

10. The cargo mat for a vehicle cargo area of claim 8, wherein the hinge is a living hinge integrally formed between the body portion and the outboard flap.

11. The cargo mat for a vehicle cargo area of claim 8, further comprising:
first and second outboard flaps extending from opposing lateral ends of the body portion each connected to the body portion with respective hinges, wherein:
the respective hinges are configured to maintain the first and second outboard flaps at the hanging angle of greater than 90 degrees when the opposing lateral ends of the body portion are supported by the lid and the first and second outboard flaps hang from the body portion unsupported by the lid.

12. A vehicle cargo compartment assembly, comprising:
a vehicle floor extending a width in a transverse direction between first and second upright vehicle walls and defining an opening for a storage compartment;
a lid sized for covering the opening, the lid extending in the transverse direction less than the width of the vehicle floor and moveable between a closed position, where the lid is positioned to cover the opening, and an open position, where the lid is removed from the opening to expose the opening and where a transverse portion of the lid is adjacent to the first upright vehicle wall; and
a cargo mat extending the width of the vehicle floor, the cargo mat having a body portion overlaying the lid and moveable with the lid between the closed position and the open position, and an outboard flap extending beyond the transverse portion of the lid to overlay an outer portion of the vehicle floor bordering the opening and extending to the first upright vehicle wall when the lid is in the closed position, wherein:
the outboard flap is connected to the body portion with a hinge, and
the hinge is configured to maintain the outboard flap at a hanging angle between a lid contacting surface of the body portion and the outboard flap of greater than 90 degrees when the body portion is supported by the lid and the outboard flap hangs from the body portion unsupported by the lid.

13. The vehicle cargo compartment assembly of claim 12, wherein:
a distal portion of the outboard flap contacts the outer portion of the vehicle floor at a contact angle less than 90 degrees when the lid is moved from the open position towards the closed position, and
the distal portion slidably engages the outer portion of the vehicle floor such that the contact angle decreases as the lid is moved toward the closed position until the distal portion is adjacent the first upright vehicle wall.

14. The vehicle cargo compartment assembly of claim 12, further comprising:
the lid hingedly coupled to the vehicle floor for rotation about an axis adjacent the vehicle floor, wherein:
at least a portion of the outboard flap proximate the axis maintains contact with the outer portion of the vehicle floor as the lid moves from the closed position to the open position.

15. The vehicle cargo compartment assembly of claim 14, wherein the hinge extends perpendicular to the axis.

* * * * *